Patented Feb. 12, 1924.

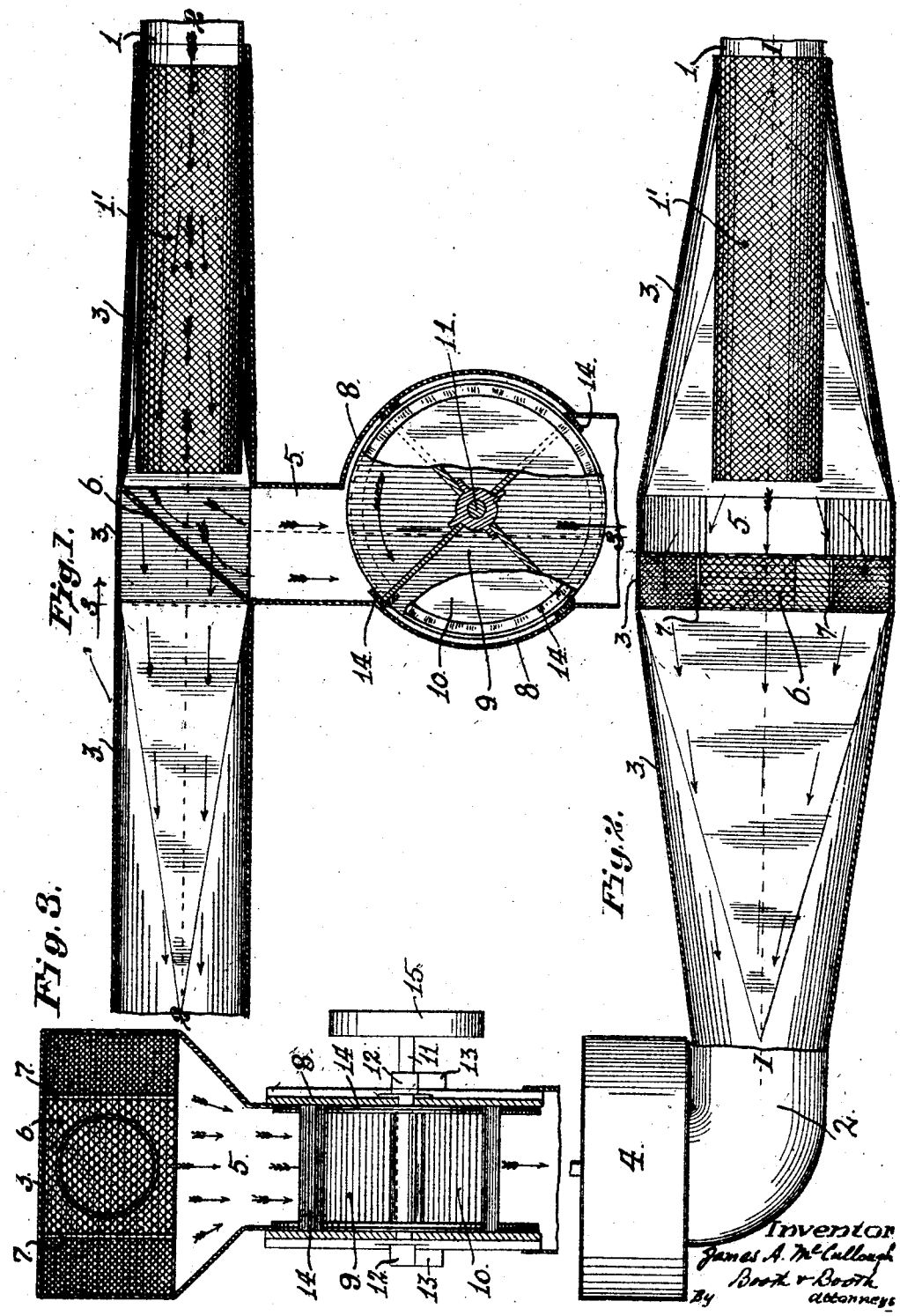

1,483,228

UNITED STATES PATENT OFFICE.

JAMES A. McCULLOUGH, OF FRESNO, CALIFORNIA.

DUST SEPARATOR.

Application filed January 16, 1923. Serial No. 612,901.

*To all whom it may concern:*

Be it known that I, JAMES A. McCULLOUGH, a citizen of the United States, residing at Fresno, in the county of Fresno and State of California, have invented certain new and useful improvements in Dust Separators, of which the following is a specification.

My invention relates to the class of dust-separators. While it may be used for the separation of the dust component or accompaniment of any material, it is especially adapted and intended for use in dried-fruit packing houses for the separation of the dust and fuzz from dried fruit, and in this connection, for the sake of illustration, I shall herein describe it.

In the sun-drying of fruit, exposure to the weather necessarily results in the collection on the fruit of much dust, which is a very objectionable feature in the packing house. Also peaches are covered with fuzz, and this too is objectionable in the packing house, as being irritating to the skin of the operatives. As a consequence, dried fruit packing houses are usually covered with dust from the fruit.

It is the object of my invention to keep these houses clean, and at the same time to effect this desirable result by a practical and economical means, using air as the dust separating agent, discharging the dust outside the building, and dropping the fruit at any desired point within the house.

While it is a simple matter to pass the dust laden fruit through a pipe by a current of air produced by blowing or induced by suction, it is quite a problem to get it out again without injury, and to drop it where wanted.

If drawn into the pipe, it usually cannot be dropped out therefrom, without passing through the fan, and thence blown through what is usually termed a "cyclone", from the bottom of which it is dropped. The cyclone, on account of its size has to be outside the building, so that the fruit is not conveniently delivered, and, moreover, the fruit is materially injured in passing through the fan.

By my invention, these difficulties are overcome, by providing an intercepting separating means and trap associated with the air conduit within the house, and adapted to drop the fruit at the desired point, the air and dust passing on out through the conduit to the exterior of the building.

The nature of my invention will be clearly understood from the following description taken in connection with the accompanying drawings, in which—

Fig. 1 is a vertical, longitudinal section, broken, of my separator on the line 1—1 of Fig. 2.

Fig. 2 is a horizontal section, broken, of the same on the line 2—2 of Fig. 1.

Fig. 3 is a vertical cross section on the line 3—3 of Fig. 1.

The air-conduit, as a whole, comprises an inlet pipe 1, to which the dust-laden material is supplied, a discharge pipe 2, Fig. 2, from which the air and separated dust are delivered, and an intervening enlarged section 3. The air-current through the conduit, by which the material is advanced and presented to the separating member, may be produced by blowing or induced by suction, the latter effect being here indicated, for the sake of illustration, by a suction fan 4, Fig. 2, associated with the discharge pipe 2 beyond the enlarged section 3, which is the zone or region of separation. The pipe sections 1 and 2 of the air conduit are of circular cross section, while the intervening enlarged section 3 tapers from each end where it is fitted upon the sections 1 and 2, towards the middle where it is of rectangular section, widened out laterally, and this central portion is open on the bottom and leads into a hopper 5, with which it is provided.

The pipe section 1 has fitted to its end a screen nozzle section 1' which extends into the taper of the enlarged section 3.

Beyond the delivery end of the screen nozzle 1' and traversing the laterally widened middle portion of the section 3 at an inclination from the top rearwardly to the bottom is the separating screen 6 which overlies the hopper 5. This screen is divided by partitions 7, the portions on each side being relatively light, while the middle portion, directly facing the delivery end of the screen nozzle 1', being relatively heavy, as seen in Figs. 2 and 3, to withstand the impact of the solid material.

Connected with the neck of the hopper 5 is a valve-trap comprising a casing 8, and a revoluble valve 9. The casing 8 is open on top and communicates directly with the neck of the hopper 5. It is also open at the bottom to permit the discharge of the cleaned material passing through the trap. The valve 9 is a member having a series of peripherally open pockets or compartments 10 sector-like about an axis shaft 11 mounted in bearings 12 on supports 13, Fig. 3. The valve member 9 fits closely within the casing 8, with rubber linings 14 between its outer surfaces and the inner walls of the casing, to prevent air from being drawn in through the trap. The valve member 9 may rotate under the weight of the material or it may be independently driven, as for example by the pulley 15 on the shaft 11, as seen in Fig. 3.

In operation the dust-laden material delivered to the inlet pipe 1 is carried forward by the air current induced by the fan 4. When it meets the screen 6, which it does with some force, it is diverted into the successively registering pockets 10 of the revolving valve member 9, as shown by the heavier arrows, while the dust is shaken off by the impact and passes through the screen as shown by the lighter arrows, and the discharge pipe 2, to its destination. The dust freed material is carried down by the revolving pockets 10 and discharged through the open bottom of the trap for subsequent disposition.

The widening out of the air conduit in the zone or region of separation, and the screen delivery nozzle 1' of the inlet pipe 1 are of advantage in separating some of the dust prior to reaching the intercepting screen 6 and in presenting an extensive area for its continued separation, so that the separating effect is not wholly confined to the immediate delivery area of the material from the end of the nozzle 1'. The fitting of the valve member 9 in its casing 8 must be a close one to prevent drawing in air through the trap, as this would create a counter current against the dropping of the fruit and tend to cause it to cling to the intercepting screen 6 above.

In applying the device to a packing-house, the outlet of the pipe 2 for discharging the air and the separated dust will be outside the building, while the separating members and trap will be inside the house, and so located as to deposit the cleaned fruit at the point desired. The inclination of the intercepting screen 6 within the air conduit, while not necessarily essential, is of advantage in avoiding the tendency of the material to press up against it under the force of the air current, and clog its meshes, since, due to this inclination, the fruit will readily and freely drop away into the trap.

I claim:—

1. A dust-separator comprising a conduit having an inlet section to which the material is supplied, a discharge section for the separated dust, and an enlarged section between said inlet and discharge sections; means for establishing an air-current through said conduit to carry the material forward; a screen traversing the conduit in its enlarged section to intercept and divert the material while permitting the air and dust to pass; a screen-walled nozzle fitted to the end of the inlet section and lying within and spaced from the enlarged section with its delivery end spaced from and registering with the middle area of the intercepting screen; and a trap communicating with the enlarged section of the conduit below the screen to receive and discharge the cleaned material.

2. A dust-separator comprising a conduit having an inlet section to which the material is supplied, a discharge section for the separated dust, and an enlarged section between said inlet and discharge sections; means for establishing an air-current through said conduit to carry the material forward; a screen traversing the conduit in its enlarged section to intercept and divert the material while permitting the air and dust to pass; partitions dividing said screen into a middle and outer sections; a screen-walled nozzle fitted to the end of the inlet section of the conduit and lying within and spaced from the enlarged section, with its delivery end spaced from and registering with the middle section of the intercepting screen; and a trap communicating with the enlarged section of the conduit below the screen, to receive and discharge the cleaned material.

In testimony whereof I have signed my name to this specification.

JAMES A. McCULLOUGH.